United States Patent Office 3,365,805
Patented Jan. 30, 1968

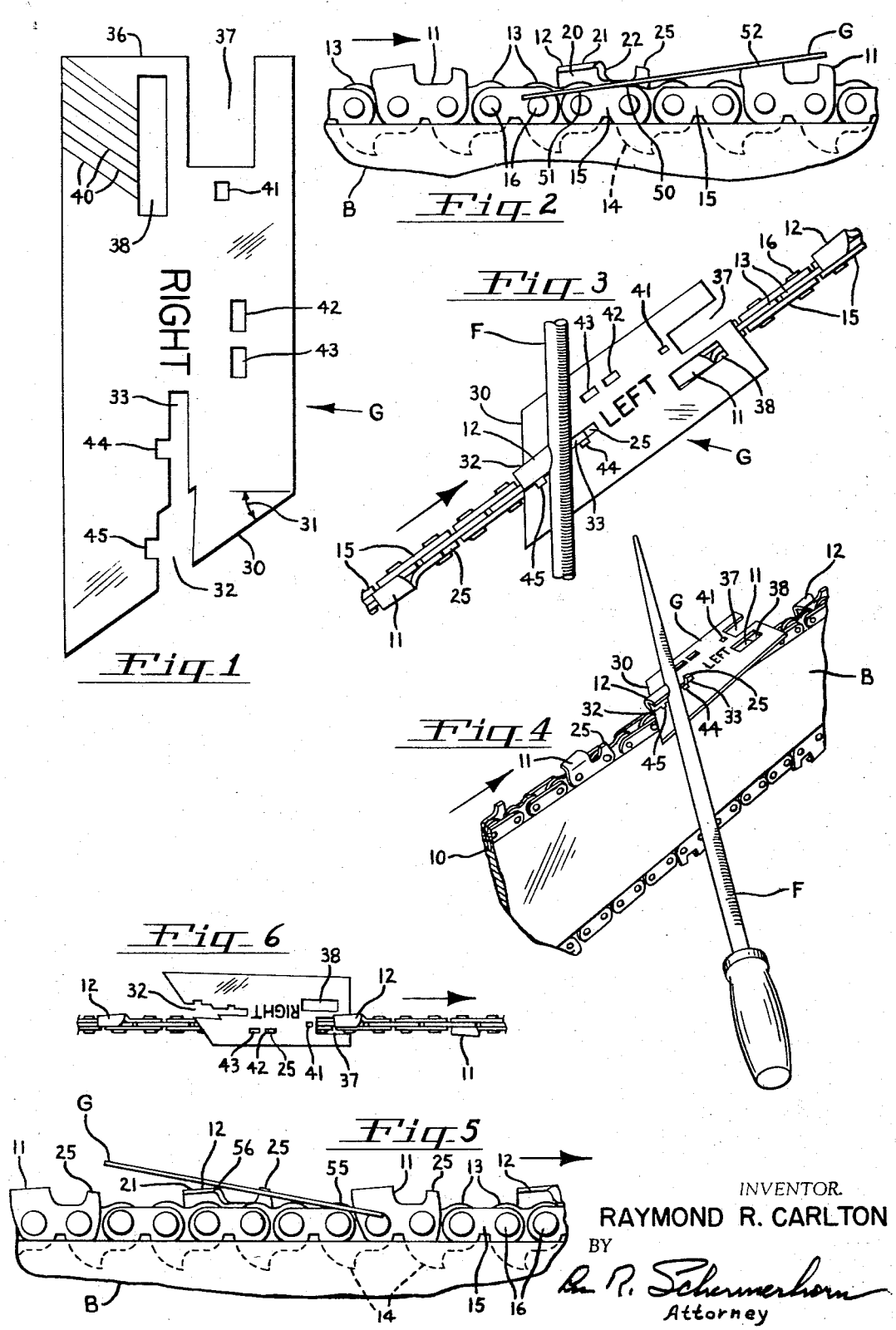
Jan. 30, 1968 — R. R. CARLTON — 3,365,805
SAW CHAIN FILING GAUGE
Filed Oct. 1, 1965
INVENTOR.
RAYMOND R. CARLTON

3,365,805
SAW CHAIN FILING GAUGE
Raymond R. Carlton, Portland, Oreg., assignor to Carlton Company, Portland, Oreg., a corporation of Oregon
Filed Oct. 1, 1965, Ser. No. 491,945
10 Claims. (Cl. 33—202)

ABSTRACT OF THE DISCLOSURE

A dual purpose flat plate gauge used as a file guide for filing both cutters and depth gauges. In sharpening a cutter tooth, the gauge plate rests in a backward sloping position parallel with the top plate of the cutter and in filing the depth gauge, the plate rests in a forward sloping position. One face of the gauge plate is turned up for filing the cutters and depth gauges of right cutters and the opposite face is turned up for filing the cutters and depth gauges of left cutters.

---

This invention relates to a filing gauge for chipper or chisel bit saw chains.

The performance of a chain saw depends almost entirely upon proper sharpening. Sharpening a chipper or chisel bit saw chain properly is quite difficult for the average user because of a number of different relationships which must be accurately maintained between different parts of the cutter links in the sharpening operation. Also, these relationships are different for the best performance when cutting soft wood or hard wood or frozen wood and when using motors of small or large horsepower with a given chain. Since the dimensions involved in such relationships are measured in very small fractions of an inch, it will be appreciated that sharpening a saw chain properly for a particular wood and saw motor presents considerable difficulty, particularly for a user without long experience and greater than average skill.

Gauging devices heretofore provided for such purpose have been either too expensive or too cumbersome to use and carry around and have provided neither the accuracy nor the versatility necessary. As a result, most saw chains do not achieve the cutting potential of which they are capable and many high quality chains are ruined prematurely, not by hard use but by improper sharpening.

It is, therefore, the general object of the present invention to provide an improved filing gauge for saw chains which is inexpensive and easy to use and which will enable a person of ordinary skill to maintain his saw chain in better condition for efficient performance and, at the same time, obtain a longer useful life from the chain.

Other objects are to provide a filing gauge which is small enough to be carried conveniently in the pocket, which will automatically maintain all the proper relationships between the various parts of the cutters for cutting soft wood or hard or frozen wood or for use with saw motors of different horsepower, and to provide a gauge which will compensate for the different relationships necessary to cause the chain to cut most efficiently as the cutters are filed back.

The present gauge comprises a small flat plate having a length approximately equal to the span across two adjacent cutter links. The plate is notched to fit the links in two different positions. In one position the plate guides the file in sharpening the top plate and side plate portions of chipper and chisel bit type of cutter links. One end of the plate is cut off at an angle to provide a visual guide for the proper direction of the file relative to the vertical plane of the links. This guide line is closely adjacent to the file, making it extremely easy to stroke the file consistently at the proper angle.

In a different position of the gauge plate, the depth gauge portion of the cutter projects through an opening in the plate whereby it is only necessary to file down the end of the depth gauge flush with the surface of the gauge plate in order to lower the tooth depth gauge the proper amount to compensate for shortening of the cutter from sharpening. One side of the gauge plate is turned uppermost for right-hand cutter links and the opposite side is turned uppermost for left-hand cutter links whereby a single gauge plate establishes relationships between the various parts of the cutter links for the whole chain. Each gauge plate is dimensioned to fit different chains of a particular pitch and two or more different gauge plates are provided for each pitch for sharpening to cut soft wood or hard or frozen wood.

The invention will be better understood and additional objects and advantages will become apparent from the following description of the preferred embodiment illustrated on the accompanying drawing. Various changes may be made in the details of construction and all such modifications within the scope of the appended claims are included in the invention.

In the drawing:

FIGURE 1 is a top plan view of a saw chain filing gauge embodying the principles of the invention, showing the side which is uppermost in filing right cutters;

FIGURE 2 is a side elevation view showing the gauge in position for filing a left cutter;

FIGURE 3 is a top plan view corresponding to FIGURE 2 and showing the position of the file;

FIGURE 4 is a perspective view of the parts shown in FIGURE 3;

FIGURE 5 is a view similar to FIGURE 2 but showing the gauge in position for filing the depth gauge on a left cutter; and FIGURE 6 is a top plan view showing the gauge in position for filing the depth gauge on a right cutter.

In FIGURES 2, 4 and 5, a portion of a conventional saw chain is shown supported in the groove 10 on the upper side of a saw bar B or a filing vise. The chain may be sharpened directly on the saw bar or it may be clamped in a similar manner in a filing vise. The direction of travel of the chain is indicated by arrows, the travel being from left to right in all of FIGURES 2 to 6.

The type of chain to which the invention applies has right cutter links 11 and left cutter links 12. Connected to the leading and trailing ends of each cutter link are drive links 13 having sprocket engaging projections 14 by which the chain is driven around the saw bar by a sprocket wheel. Opposite each cutter link is a tie strap 15 and on opposite sides of the drive links 13 and interconnecting adjacent drive links are pairs of the tie straps 15. These tie straps and links are all pivotally connected together by rivets 16.

This arrangement places all the drive links 13 in a common vertical plane for travel in the groove 10 of the saw bar and whereby the projections may be clamped in a filing vise if desired. The right cutter links 11 are disposed on one side of the plane of the drive links and the left cutter links 12 are disposed on the opposite side. The tie straps on one side are in the vertical plane of right cutter links 11 and the tie straps on the opposite side are in the vertical plane of left cutter links 12.

The cutters are of the chipper or chisel bit type, or a combination type, each having an upstanding side plate portion 20 and a nearly horizontal top plate portion 21. The cutting edge 22, which must be sharpened, comprises in part the leading edge of the side plate portion 20 and the leading edge of the top plate portion 21 and a curved transition or corner between these two portions. Top plate portion 21 slopes backward at a slight clearance angle whereby the height of the cutting edge is gradually reduced as the tooth is sharpened repeatedly and the side and top plate portions become shorter.

For cutting soft wood, the cutting edge of the side plate portion 20 is ordinarily disposed in a vertical line or with a very slight forward slope. On the other hand, for cutting hard or frozen wood this upright cutting edge preferably has a back slope making an angle of 75° to 85° with the horizontal. In all cases the cutting edge of the top plate 21 slopes at an angle of preferably 35° from a transverse direction in plan view as seen in FIGURE 3.

The forward end of each cutter link carries an upstanding depth gauge 25 which is spaced forward from cutting edge 22. The height of this depth gauge determines the depth of cut made by the forward cutting edge of top plate portion 21 since the depth gauge rides in the bottom of the kerf and limits the depth of penetration of cutting edge 22. Thus, the depth gauge on a particular chain may be approximately .030 inch lower than the cutting edge on top plate portion 21 but this dimension varies with the size of the chain and the horsepower of the motor and whether soft wood or hard or frozen wood is to be cut. In order to maintain a uniform depth of cut, it will be apparent that the depth gauge must be lowered whenever the cutting edge 22 is lowered through sharpening. The saw does not operate efficiently when the depth gauge is too high or too low relative to the cutting edge of top plate 21. The purpose of the present invention is to provide a gauge device which will maintain the above described relationships.

The gauge plate G of the invention is illustrated in FIGURE 1, showing the side of the plate which is turned uppermost in filing the right cutters. This is a flat steel plate with hardened, smooth, polished surfaces on its opposite sides that will not be cut by the file. In use, the plate is mounted on the chain with its side edges parallel with the vertical plane of the chain as shown in FIGURE 3. One end edge 30 is cut off at a 35° angle as indicated at 31. In the center of this edge is a longitudinal slot having an outer end portion 32 to receive the upstanding side plate portion of a cutter tooth. This slot continues back to a narrower inner end portion 33 which fits the vertical depth gauge 2. The sides of slot portion 32 are relived or notched as shown to clear certain portions of the illustrated chain and other similar chains which vary slightly from the one illustrated.

The other end 36 of the plate is preferably cut off square and provided with a wide slot 37 adjacent to the short side of the plate. Alongside slot 37 is a cutter link gauge hole 38 provided with measuring indicia 40. Along the short side of the plate are also arranged three other rectangular openings 41, 42 and 43.

For sharpening a left cutter, the gauge plate G is turned over from its FIGURE 1 position and applied to the chain in tension position as shown in FIGURES 2, 3 and 4 with the gauge plate extending forward from the tooth to be sharpened. The tooth to be sharpened is placed in slot portion 32 with the depth gauge 25 of the tooth positioned at the end of slot portion 33. The gauge plate is disposed on an incline with a portion of a plate adjacent depth gauge 25 supported on a drive link 13 at point 50 and a portion at point 51 on the tie strap 15 opposite the cutter to be sharpened.

Notches 44 and 45 allow the gauge plate to drop down to the desired level on the chain. Notch 44 fits over the drive link and notch 45 fits over the edge of the tie strap. By elongating these notches the gauge plate will drop lower, thus lowering the file, when desired. The relieved side portions of slot portion 32 clear other parts of the chain. This slot portion is shaped to match the contour of the cutter tooth when viewed from the top so as to make it easier for the user to see how the gauge fits over the cutter.

The round file F is then applied to the cutting edge 22 in an oblique horizontal position, holding the file flat against the gauge plate and parallel with its angular end 30 as shown in FIGURES 3 and 4. When the file is stroked longitudinally in this position, it sharpens all parts of cutting edge 22 comprising that part on side plate portion 20, that part on top plate portion 21 and that part in the curve at the corner between these two plate portions. This makes the cutting edge on side plate portion 20 vertical as seen in side elevation and it provides the desired 35° angle in the top plate portion as seen in plan view in FIGURE 3. This is the normal tooth configuration for cutting soft wood but the angle of the side plate cutting edge may vary as hereinafter explained.

The file stabilizes the gauge plate on its two supporting points 50 and 51, leaving both hands free to manipulate the file. It will be observed in FIGURE 2 that gauge plate G is parallel with cutter top plate 21 whereby the relationship of the file to the cutter does not change as the cutter is shortened by filing. However, the gauge plate may be supported in either direction out of parallelism with top plate 21, if this should ever be desired, by merely varying the widths of notches 44 and 45. Point 52 provides a secondary support on the cutter ahead of the one being sharpened, this point of support having sufficient width to support the gauge plate when the file is lifted or removed. The gauge plate need not touch the chain at point 52 during filing.

By making gauge plate G of thinner material, or by widening notches 44 and 45, the file will ride lower on the tooth to provide a slight forward slope on the cutting edge of side plate portion 20 as is sometimes desired for soft wood. By making the gauge plate of thicker material, or by narrowing notches 44 and 45, the file will ride higher on the tooth and form a back slope on the cutting edge of side plate portion 20 for cutting hard wood or frozen wood. This slope does not vary when the cutter becomes shortened from filing, as long as the gauge plate is maintained parallel with top plate 21. If the gauge plate is supported out of parallelism, as mentioned above, the slope may be caused to vary as the cutter becomes shorter. The same size file is used in all cases, this being specified by the chain manufacturer.

FIGURE 5 shows the position of gauge plate G in side elevation for filing a depth gauge on a left cutter and FIGURE 6 shows the position of the gauge plate in top plan view for filing the depth gauge on a right cutter. In FIGURE 5 the side of the gauge plate shown in FIGURE 3 is placed uppermost and in FIGURE 6 the side of the gauge plate shown in FIGURE 1 is placed uppermost. In both cases, the sides of slot 37 straddle the cutter ahead of the one being worked on and the plate rests on the adjacent drive link at point 55. The depth gauge to be filed is placed in one or the other of holes 42 or 43 and the rear end of the gauge plate is rested at point 56 in inclined position on the top plate portion 21 of the tooth being worked on, as best shown in FIGURE 5. Then a file is stroked across the protruding portion of the depth gauge until the depth gauge is levelled with the inclined top surface of gauge plate G. This provides a slightly sloping top surface on the depth gauge which is desirable.

Holes 42 and 43 provide an option in the height of the depth gauge and additional holes may be provided for a greater selection of depth gauge settings if desired. When hole 42 is used, the gauge plate assumes a steeper angle in FIGURE 5 whereby the depth gauge is lowered to a greater extent than when hole 43 is used. Slot 32, 33, being relatively narrow and offset to one side of slot 37, lies at one side of the chain as seen in FIGURE 6 and does not interfere with the positioning of the gauge plate as described. Depending upon the thickness of the gauge plate, hole 41 is necessary in some cases to admit the highest point of the curved top of the drive link which is immediately behind the slot 37 and thereby slightly lower the point of support at 55. As the chain is sharpened from time to time, side plate portion 20 and top plate portion 21 become shorter and lower the point of support at 56 for the gauge plate whereby depth gauge 25 is correspondingly lowered when it is filed down flush with the gauge plate.

As a saw chain cutter is filed back it is necessary that the relationship between the top plate cutting edge and the height of the depth gauge change for most efficient cutting. For example, if a saw chain cuts best on a particular saw in a particular wood with the depth gauges set at .030 inch below the top plate cutting edges when the chain is new, the depth gauges will have to be set somewhat lower in relation to the top plate cutting edges as the cutters are filed back in order for this chain to cut as efficiently as it did when it was new.

The present gauge does this automatically. This results from the geometry of the gauge plate and chain in FIGURE 5. Although point 56 moves down slightly as it moves back, the portion of the gauge plate at depth gauge 25 drops faster. This varying relationship will be apparent from the fact that holes 42 and 43 would drop even if top plate 21 were horizontal, causing point 56 to move back at its original height. When the inclination of the gauge plate is reduced, the high point of the sloping depth gauge is lowered most. Conventional filing gauges do not change this relationship and the chain cuts less efficiently after many sharpenings.

Because chain saws are in many sizes, from two to eight horsepower for example, and because wood varies in hardness and size of log, it is necessary to provide the user with a selection of depth gauge settings (42, 43) for his chain. The horsepower of the saw dictates to a large degree the size, or pitch, or chain to be used on that saw—the greater the horsepower the larger the chain. Also, the larger the chain the more the depth gauge is lowered below the top plate cutting edge.

However, many users do not use the chain recommended for their saws. Often the user buys a smaller chain than recommended because a small chain cuts faster. This makes it necessary for the user to have means to adjust his chain to his conditions. For this reason, at least two different depth gauge settings 42, 43 are provided on the present gauge. These two settings should ordinarily be sufficient unless the user is using the wrong size of chain and the wrong gauge. Each gauge is marked (not shown in drawing) to designate the size of chain on which it is to be used.

The above described groups of slots and holes for sharpening the teeth and lowering the depth gauges may be rearranged, if desired, to make the gauges more convenient for different users such as right-handed and left-handed people or to make the gauge easier to manufacture or more functional. Also, it is to be noted that there are other types of chains in which the depth gauge for each cutter is not formed on the cutter link itself. The depth gauges may be on the center drive links or on the tie straps. The invention is applicable to all such chains by arranging the slots and holes in the gauge plate to fit such chains; the invention is not limited tot he specific chain illustrated herein.

When the cutter side and top plate portions reach a certain minimum length, the chain cannot be resharpened and must be discarded. Opening 38 is calibrated as a cutter length gauge. By inserting the cutter elements into this opening, their lengths may be conveniently measured. This opening is positioned so that it will not admit the cutter ahead of the one being sharpened in FIGURE 3 and so does not interfere with the use of the gauge plate as described in connection with FIGURES 2 to 4.

One gauge plate of predetermined thickness is provided for cutting soft wood and another gauge plate of greater predetermined thickness is provided for cutting hard or frozen wood. Each gauge plate is used on both right and left cutters by merely turning it over. The extreme simplicity and compactness of the gauge plate makes it inexpensive to purchase and convenient to carry in the pocket so that the user may have readily available means for keeping his saw chain in its most efficient cutting condition for the work at hand.

Having now described my invention and in what manner the same may be used, what I claim as new and desire to protect by Letters Patent is:

1. A filing gauge for a saw chain having cutter teeth wherein each cutter tooth has a depth gauge, side plate and a backward sloping top plate, said gauge comprising a flat plate having a slot to straddle a depth gauge and side plate on a cutter tooth to be sharpened, and a flat bottom face on the gauge plate arranged to support the gauge plate on the chain with the top face of the gauge plate sloping approximately parallel with said top plate of the tooth.

2. A saw chain filing gauge comprising an elongated flat plate having a slot extending longitudinally into the plate from one end thereof, the outer end of said slot being arranged to straddle a cutter tooth to be sharpened and the inner end of the slot being arranged to fit the depth gauge of said tooth with said one end of the plate supported on the chain alongside said cutter tooth and the opposite end of the plate supported in inclined position on top of the next cutter tooth ahead of said cutter tooth to be sharpened, said one end of said plate being cut off at an angle corresponding to the desired top plate angle of the cutter teeth to provide a visual guide for a hand file, the top surface of said plate behind said depth gauge providing a mechanical guide for said file in sharpening said cutter tooth.

3. A filing gauge as defined in claim 2, said plate being reversible whereby one face is turned uppermost for sharpening left cutters and the opposite side is turned uppermost for sharpening right cutters.

4. A saw chain filing gauge comprising an elongated plate having a slot extending longitudinally into the plate from one end thereof, the outer end of said slot being arranged to straddle a cutter tooth to be sharpened and the inner end of the slot being arranged to fit the depth gauge of said tooth with said one end of the plate supported on the chain alongside said cutter tooth and the opposite end of the plate extending over the next cutter tooth ahead of said cutter tooth to be sharpened, said one end of said plate being cut off at an angle corresponding to the desired top plate angle of the cutter teeth to provide a visual guide for a hand file, the top surface of said plate behind said depth gauge providing a mechanical guide for said file in sharpening said cutter tooth, and means to gauge the filing of a cutter tooth depth gauge, said means comprising an opening in said plate to fit the depth gauge and a slot in the opposite end of the plate to straddle the cutter tooth ahead of the tooth having said depth gauge to be filed.

5. A saw chain filing gauge comprising a flat plate having side edges and an end edge disposed at an angle corresponding to the desired top plate angle of a saw chain cutter tooth, and a longitudinal slot extending into said plate from said end edge, the outer end of said slot being arranged to straddle a tooth to be sharpened and the inner end of said slot being arranged to fit the depth gauge of said tooth with said end of the plate supported on the chain alongside said cutter tooth and the opposite end of the plate supported in inclined position on the top of the next cutter tooth ahead of the cutter tooth to be sharpened.

6. A filing gauge for a saw chain having cutters with depth gauges on their front ends, drive links on one side of each cutter connected to the front and rear ends of the cutter, and a tie strap opposite each cutter connected to said drive links; said filing gauge comprising an elongated flat plate having a longitudinal slot in one end thereof, said slot having an outer end arranged to straddle a cutter to be sharpened and an inner end arranged to fit the depth gauge of said cutter with the opposite end of said plate overlying the next cutter ahead of said cutter to be sharpened, and a pair of notches in one side of said slot arranged to form supporting points for said plate on the drive link which is connected to the front end of said cutter to be sharpened and said tie strap when a file is rested on said plate.

7. A filing gauge for a saw chain having cutter teeth with depth gauges, comprising a flat plate having an opening intermediate its ends to fit the depth gauge of a tooth being filed with one end of the plate supported in inclined position on the cutter portion of the tooth, and a slot in the opposite end of the plate to straddle the cutter tooth ahead of said tooth being filed with said opposite end of the plate supported on a portion of the chain.

8. A filing gauge for a saw chain having cutter teeth with depth gauges, comprising a plate having a slot in one end to straddle the cutting portion and depth gauge portion of a tooth to be sharpened with the opposite end of the plate extending over the next tooth ahead of said tooth to incline the plate in a rearward direction for guiding a file in sharpening said cutting portion, an opening intermediate the ends of the plate to fit the depth gauge in a different position of the plate with said one end of the plate resting on the cutting portion of the same tooth, and a slot in the opposite end of the plate to straddle the tooth ahead of said same tooth with the plate inclined forward for filing said depth gauge.

9. A filing gauge for a saw chain having cutter teeth with depth gauges, comprising an elongated flat plate having a longitudinal slot in one end thereof, said slot having a wide outer end portion to straddle a cutter tooth and a narrow inner end portion to fit the depth gauge of said tooth with said plate extending forward from said tooth, said plate in gauging position extending in inclined position over the tooth ahead of the tooth in said slot.

10. A filing gauge for a saw chain having cutter teeth with depth gauges, comprising an elongated flat plate having one end disposed at an oblique angle, a longitudinal slot in said one end of the plate having a wide outer end portion to straddle a cutter tooth and a narrow inner end portion to fit the depth gauge of said tooth, a slot in the opposite end of said plate to straddle a cutter tooth, and an opening intermediate the ends of said plate to fit a depth gauge, said last slot and opening being offset laterally from said first slot.

References Cited
UNITED STATES PATENTS

| | | | |
|---|---|---|---|
| 887,742 | 5/1908 | Scott | 33—202 |
| 2,592,278 | 4/1952 | Hanson | 33—202 |
| 2,707,409 | 5/1955 | Fitch | 33—202 X |
| 2,737,830 | 3/1956 | Siverson et al. | 76—31 |
| 3,055,115 | 9/1962 | Tyrrell | 33—202 |

WILLIAM D. MARTIN, JR., *Primary Examiner.*